United States Patent
Nakama

(10) Patent No.: US 7,805,506 B2
(45) Date of Patent: Sep. 28, 2010

(54) ELECTRONIC DEVICE AND CONTROL METHOD THEREFOR

(75) Inventor: Satoshi Nakama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1001 days.

(21) Appl. No.: 11/044,150

(22) Filed: Jan. 27, 2005

(65) Prior Publication Data

US 2005/0198227 A1 Sep. 8, 2005

(30) Foreign Application Priority Data

Jan. 30, 2004 (JP) .............................. 2004-024729

(51) Int. Cl.
*G06F 15/173* (2006.01)

(52) U.S. Cl. ..................................... 709/223

(58) Field of Classification Search .................. None
See application file for complete search history.

(56) References Cited

U.S. PATENT DOCUMENTS

| | | | |
|---|---|---|---|
| 6,282,387 B1 * | 8/2001 | Yamada | 399/75 |
| 6,298,405 B1 * | 10/2001 | Ito et al. | 710/107 |
| 7,143,150 B1 * | 11/2006 | Nuggehalli | 709/221 |
| 7,185,046 B2 * | 2/2007 | Ferstl et al. | 709/201 |
| 7,286,252 B2 * | 10/2007 | Kawabuchi et al. | 358/1.15 |
| 7,316,022 B2 | 1/2008 | Nishio | |
| 7,349,114 B2 | 3/2008 | Otsuka | |
| 7,392,299 B2 * | 6/2008 | Maekawa | 709/220 |
| 2003/0053082 A1 * | 3/2003 | Tomito et al. | 358/1.2 |
| 2003/0193701 A1 * | 10/2003 | Ohara | 358/518 |
| 2004/0267914 A1 * | 12/2004 | Roe et al. | 709/222 |
| 2005/0088689 A1 | 4/2005 | Suga | |

FOREIGN PATENT DOCUMENTS

| | | |
|---|---|---|
| JP | 2003-006133 | 1/2003 |
| JP | 2003-091400 | 3/2003 |
| JP | 2003-233472 | 8/2003 |
| JP | 2003-337510 | 11/2003 |
| JP | 2004-015234 | 1/2004 |

OTHER PUBLICATIONS

"UPnP™ Device Architecture," Version 1.0, Jun. 8, 2000 10:41 AM, UPnP™ Forum, at http://www.upnp.org/specs/arch/UPnPDA10_20000613.htm.

(Continued)

*Primary Examiner*—Vivek Srivastava
*Assistant Examiner*—Minh-Chau Nguyen
(74) *Attorney, Agent, or Firm*—Cowan, Liebowitz & Latman, P.C.

(57) ABSTRACT

When participating in a network, an electronic device which can connect to the network as an UPnP control point acquires a description for each of a plurality of electronic devices connected to the network. The electronic device analyzes the acquired description, and extracts an external device which adapts a predetermined operation mode. Then, the electronic device transmits a predetermined confirmation message to the extracted external device, and confirms whether the electronic device itself can shift to the operation mode. When confirming that the electronic device can shift, the operation state of a digital video camera shifts to the predetermined mode.

10 Claims, 7 Drawing Sheets

OTHER PUBLICATIONS

R. Droms, "Dynamic Host Configuration Protocol," Network Working Group, RFC 2131, Bucknell University, Mar. 1997, at http://www.ietf.org/rfc/rfc2131.txt.

Stuart Cheshire et al., "Dynamic Configuration of Link-Local IPv4 Addresses", ZEROCONF Working Group, Internet-Draft, Sep. 29, 2003 at http://tools.ietf.org/id/draft-ietf-zeroconf-ipv4-linklocal-10.txt.

"White Paper of CIPA DC-001-2003, Digital Photo Solutions for Imaging Devices," Camera & Imaging Products Association, Feb. 3, 2003.

Basic Imaging Profile—Interoperability Specification dated Jul. 25, 2003, pp. 1 and 76-78.

An Office Action from the Japanese Patent Office dated Jan. 23, 2009 concerning basic Japanese Patent Application No. 2004-024729.

* cited by examiner

F I G. 3
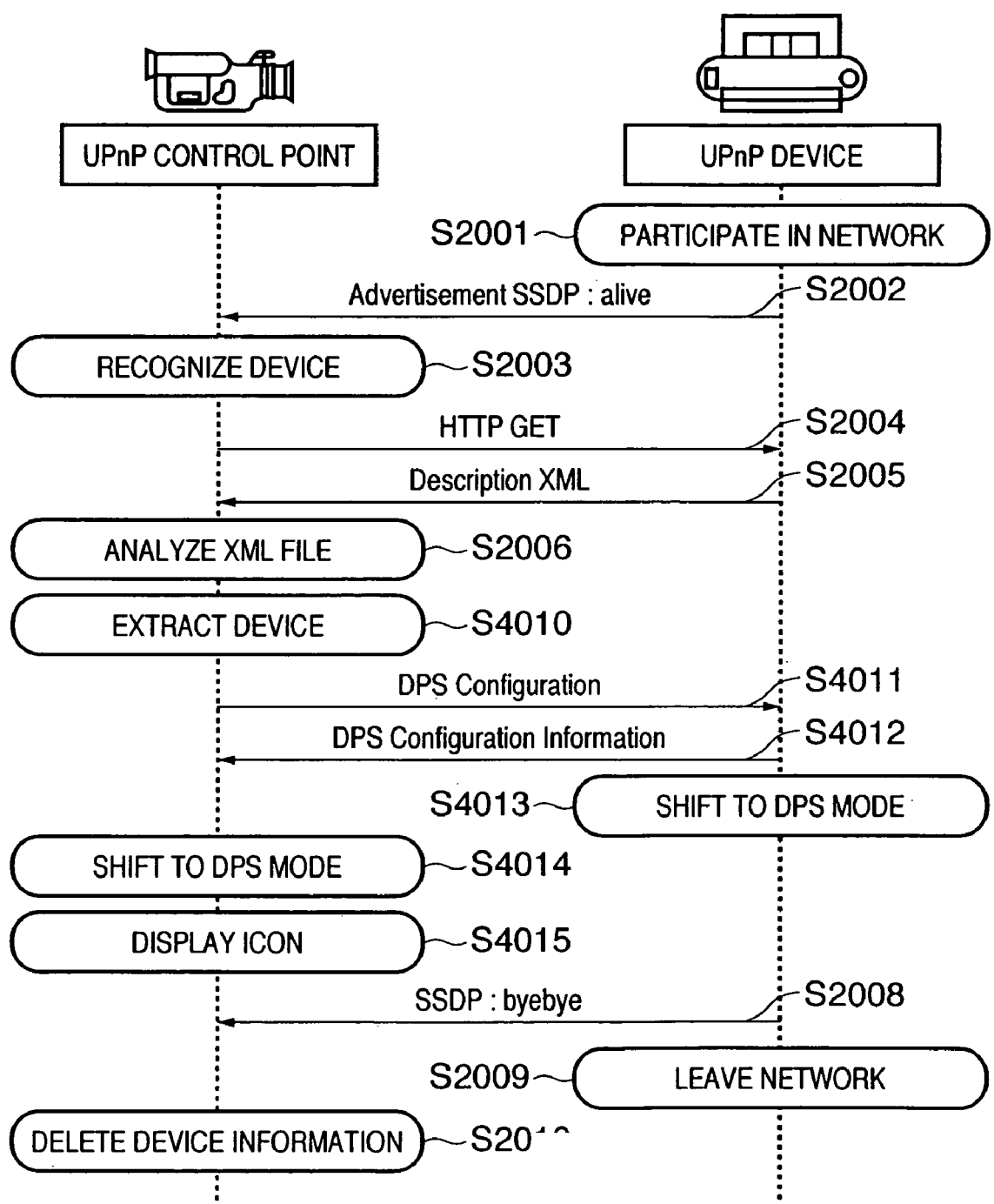

FIG. 4

```xml
<?xml version="1.0"?>
<root xmlns="urn:schemas-upnp-org:device-1-0">
   <specVersion>
      <major>1</major>
      <minor>0</minor>
   </specVersion>
   <URLBase>http://192.168.0.3</URLBase>
   <device>
      <deviceType>urn:schemas-upnp-org:device:Printer:1</deviceType>
      <friendlyName>UPnP BJ Printer</friendlyName>
      <manufacturer>Canon Inc.</manufacturer>
      <manufacturerURL>http://canon.jp/</manufacturerURL>
      <modelDescription>UPnP BJ Printer</modelDescription>
      <modelName>P-4649</modelName>
      <modelNumber>4649</modelNumber>
      <modelURL>http://canon.jp/Printer/P4649/</modelURL>
      <serialNumber>0000001</serialNumber>
      <UDN>uuid:6c7d849d-b704-4855-ac5d-0c780d4cee7c</UDN>
      <UPC>000000000001</UPC>
      <iconList>
         <icon>
            <mimetype>image/png</mimetype>
            <width>16</width>
            <height>16</height>
            <depth>2</depth>
            <url>/images/printer.png</url>
         </icon>
      </iconList>
      <serviceList>
         <service>

<serviceType>urn:schemas-upnp-org:service:PrintBasic:1</serviceType>
            <serviceId>urn:upnp-org:serviceId:PrintBasic</serviceId>
            <controlURL>/control/PrintBasic</controlURL>
            <eventSubURL>/event/PrintBasic</eventSubURL>
            <SCPDURL>/PrintBasic.xml</SCPDURL>
         </service>
      </serviceList>
      <presentationURL>/presentation/Printer.html</presentationURL>
      <DPS>9876</DPS>
   </device>
</root>
```

ELECTRONIC DEVICE AND CONTROL METHOD THEREFOR

FIELD OF THE INVENTION

The present invention relates to a technique for extracting a desired external device from a network configured by a plurality of devices, and controlling the extracted external device.

BACKGROUND OF THE INVENTION

In recent years, a network technique for searching for a device which provides a predetermined service on a network has been developed. As one example of this technique, Microsoft Corporation proposes UPnP (Universal Plug and Play) (Universal Plug and Play Device Architecture Version 1.0, 8 Jun. 2000 10:41 AM). UPnP defines a "service", "device", and "control point". The service is a logical unit for providing a predetermined service, the device is a logical unit including one or more services, and the control point is a logical unit for controlling the one or more services. The device and control point defined by UPnP will be called an "UPnP device" and "UPnP control point".

The UPnP device and the UPnP control point notify of and detect the service and the like by using SSDP (Simple Service Discovery Protocol). The service and the like are notified by transmitting a discovery message which includes the URL of a device description file in XML (Extensible Markup Language).

When connecting to an UPnP network, the UPnP device acquires an IP address from a DHCP server on the network, and multicasts the pieces of information of the type and service of the device as an ssdp:alive message on the network. For example, when the UPnP device serves as a VTR, the device describes and transmits the pieces of information of the type of an available recording medium, recording format, playback function, and the like in the XML. The pieces of information of the corresponding recording medium and recording format are defined as state variables, and the function of operating the devices, e.g., a playback function is defined as an action. When the UPnP device is disconnected from the UPnP network, it is recommended to multicast an ssdp:byebye message which notifies of the disconnection. Note that the ssdp:alive message describes the term of validity of the UPnP device and service which are notified by the ssdp:alive message. When the ssdp:byebye message is not transmitted, the UPnP control point disables the corresponding service and the like after the term of validity described in the received ssdp:alive message.

Furthermore, data communication on a wireless network between PCs and cellular phones has rapidly prevailed. Such wireless networking is sweeping into digital devices, and all of the digital devices are connected by mixing the wired and wireless techniques.

In the above-described arrangement, assume that a digital camera and digital video camera are simultaneously connected to the network with a plurality of devices. When the user tries to select a specific printer from the plurality of digital devices, the user can only acquire pieces of information of many devices on the network, and find to select the specific printer from the acquired pieces of device information. Therefore, as the number of the connected devices increases, selection of the specific device from the plurality devices is increasingly troublesome for the user.

SUMMARY OF THE INVENTION

The present invention has been made in consideration of the above problem, and has as its object to automatically extract and select a specific device to be controlled, on the basis of pieces of information from a plurality of devices in a network.

In order to achieve the above object, an electronic device of the present invention has the following arrangement. That is, there is provided an electronic device which can connect to a network, comprising an acquisition unit configured to acquire a description for each of the plurality of electronic devices connected to the network, an extraction unit configured to extract an external device which adapts an operation mode by analyzing the description acquired by the acquisition unit, a confirmation unit configured to confirm whether the electronic device can shift to the operation mode, by transmitting a predetermined confirmation message to the external device extracted by the extraction unit, and a shifting unit configured to shift an operation state of the electronic device to the predetermined operation mode when the confirmation unit confirms that the electronic device can shift.

In order to achieve the above object, an electronic device according to another embodiment of the present invention has the following arrangement. That is, there is provided an electronic device which can connect to a network, comprising a first transmission unit configured to broadcast a message which describes access information for accessing to a description, in participating in the network or in accordance with a first message from an external device, a second transmission unit configured to transmit a message including the description to a source, upon reception of a second message including the access information from the external device, a determination unit configured to determine whether the electronic device can shift to the operation mode, in receiving a third message including an indication to shift to a predetermined operation mode, and a control unit configured to return a response message to the third message, and shifting the electronic device to the operation mode, when the determination means determines that the electronic device can shift.

Also, in order to achieve the above object, an electronic device system according to still another embodiment of the present invention has the following arrangement. That is, there is provided an electronic device system in which a plurality of electronic devices are mutually connected via a network, comprising a collection unit configured to, of the plurality of electronic devices, cause a first electronic device connected as a control point to collect descriptions from remaining electronic devices, an extraction unit configured to extract, from the remaining electronic devices, an electronic device which adapts an operation mode designated by the first electronic device, by analyzing the descriptions collected by the collection unit, a confirmation unit configured to confirm whether the electronic device can shift to the operation mode, by transmitting a predetermined confirmation message to the electronic device extracted by the extraction unit, and a shifting unit configured to shift the operation state of the electronic device and the operation state of the extracted electronic device to the predetermined operation mode when the confirmation unit confirms that the electronic device can shift.

The present invention can automatically extract and select the specific device to be controlled, on the basis of the pieces of information from the plurality of devices in the network.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flowchart for explaining exchange of messages when an UPnP device participates in the network;

FIG. 4 is a view showing an example of a description file;

DETAILED DESCRIPTION OF THE PREFERRED EMBODIMENT

A preferred embodiment of the present invention will now be described in detail in accordance with the accompanying drawings.

Figure 1:
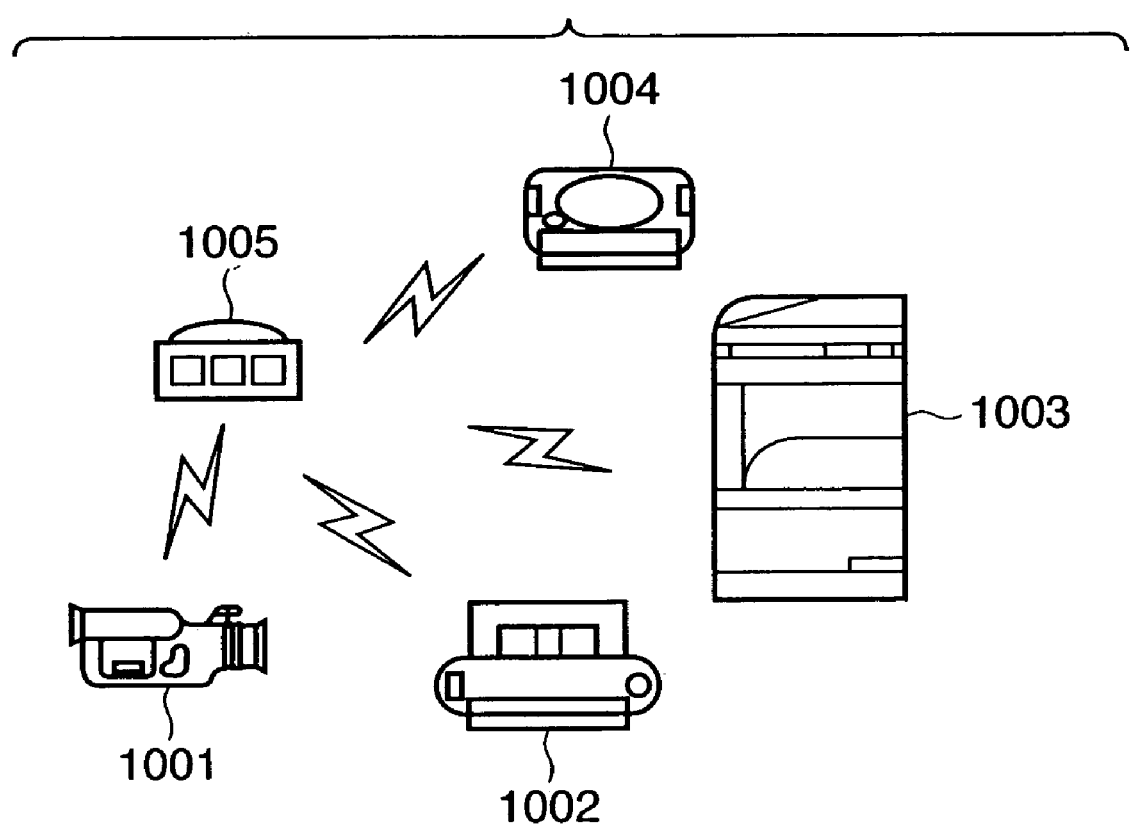
FIG. 1 is a view showing an example of a network arrangement according to an embodiment.

FIG. 1 is a view showing an example of an UPnP network according to a preferred embodiment of the present invention. In this embodiment, electronic devices 1001 to 1005 are based on the IEEE802.11b standard, and operate in an infrastructure mode. In FIG. 1, reference numeral 1001 denotes a digital video camera (to be referred to as a DVC hereinafter); 1002, an inkjet printer; 1003, a copying machine; 1004, a CP printer; and 1005, a router which serves as a wireless LAN access point which is based on the IEEE802.11b standard. Besides the wireless LAN access point, the router 1005 also serves as a DHCP server which assigns IP addresses to the electronic devices 1001 to 1005 in the network (see RFC 2131 "Dynamic Host Configuration Protocol"). The router 1005 also controls routing of a packet on the network. Note that the present invention is not limited to the network which is based on the IEEE802.11b standard to operate in the infrastructure mode. For example, the present invention can also be implemented on a network which is based on the IEEE802.11b standard, and operate in an adhoc mode. The present invention can also be implemented on the network which has a part or entire network configured by using a wireless or wired communication scheme besides the IEEE802.11b standard.

Figure 2:
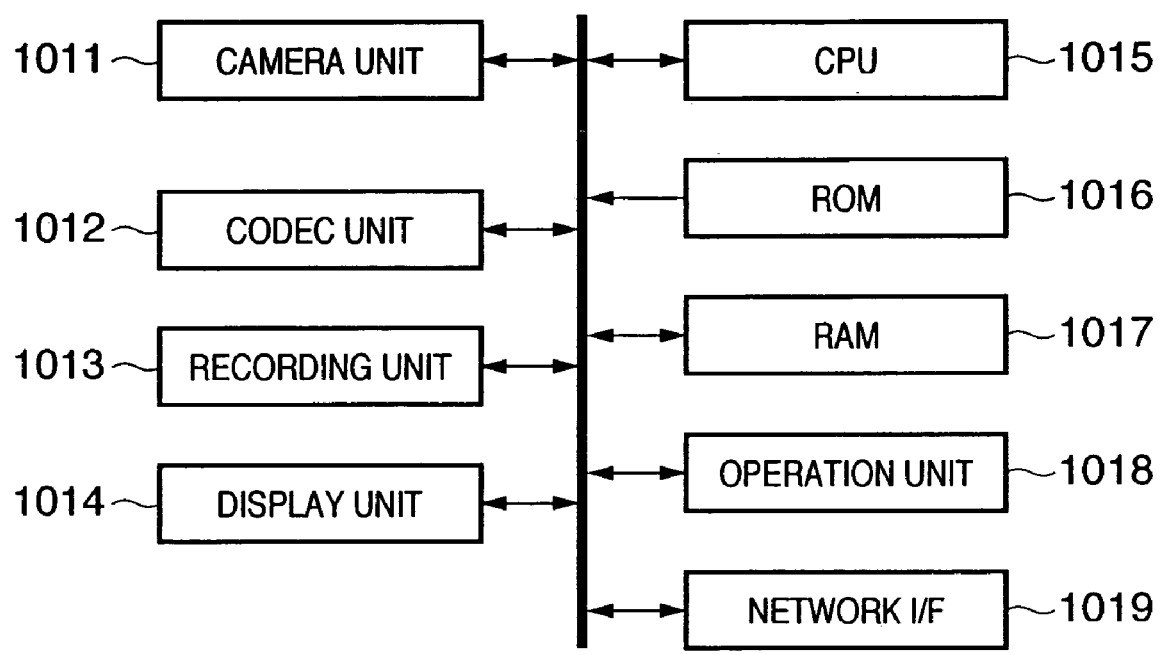
FIG. 2 is a block diagram showing the main element of a digital video camera according to the embodiment.

FIG. 2 is a block diagram showing the main element of the DVC 1001. In FIG. 2, a CPU 1015 controls the DVC 1001. A ROM 1016 stores, for example, a processing program executed by the CPU 1015, and device-specific information for uniquely identifying the DVC 1001. A RAM 1017 provides the work area of the CPU 1015. An operation unit 1018 includes various switches and buttons for selecting an image and instructing to record and playback the image, and a button for performing network connection. A network interface unit 1019 has an interface (interface based on the IEEE802.11b standard in this embodiment) which connects the DVC 1001 to the network. A camera unit 1011 includes an optical lens, image sensor (CCD sensor), and the like. A codec unit 1012 compression-encodes the image data obtained by the camera unit 1011, and decodes the compressed image data. A recording unit 1013 writes the image data in a recording medium (magnetic tape, memory card, and the like), and reads the image data from the recording medium. For example, a display unit 1014 includes a liquid crystal display to provide a graphical user interface (GUI) such as an icon.

In FIG. 1, each of the electronic devices 1001 to 1004 has a function defined by UPnP. The router 1005 is an "IGD (Internet Gateway Device)" defined by UPnP, which sets the IP address by using the DHCP server function.

Along with power-on and physical connection, each of the electronic devices 1001 to 1004 first tries to connect to the access point in the wireless LAN infrastructure mode. When the connection to the router 1005 serving as the access point is established in the wireless LAN, each of the electronic devices 1001 to 1004 tries to acquire the IP address by using the DHCP server included in the router 1005. If the IP address is not acquired by using the DHCP server because of the absence of the DHCP server on the network, each of the electronic devices 1001 to 1004 determines its own IP address using AutoIP (see Dynamic Configuration of IPv4 link-local addresses).

With reference to FIG. 3, a message delivery procedure in which a new UPnP device participates in the network will be described below. In FIG. 1, the DVC 1001 can participate in the network as an UPnP control point, and the inkjet printer 1002, copying machine 1003, and CP printer (Color Photo Printer) 1004 participate in the network as the UPnP devices. A case wherein the inkjet printer 1002 newly participates in the network including the DVC 1001 will be described below.

Upon acquiring the IP address, the UPnP control point (DVC 1001) monitors a port 1900 having IP address "239.255.255.250" which is the multicast IP address of an SSDP message used on the UPnP network. Hence, the UPnP control point can detect another electronic device which participates in the network. In step S2001 shown in FIG. 3, the connection of the UPnP device is detected, and the DHCP server (router 1005) determines the IP address which represents that the electronic device participates in the UPnP network. The UPnP device which participates in the UPnP network transmits an ssdp:alive message called an Advertise message of a discovery message in an UPnP protocol, to a multicast address defined by UPnP using SSDP (step S2002).

Since this message is received, the UPnP control point recognizes that the UPnP device has participated in the network (step S2003). Upon recognizing that the UPnP device has participated in the network, the UPnP control point transmits a GET command in HTTP (HTTP GET) to the URL of a description file described in the received message. Hence, an XML file is acquired from the UPnP device (step S2004). In response to the HTTP GET request, the UPnP device adds XML data of the description file to an HTTP body, and transmits the data.(step S2005). Since the XML file received from the UPnP device is analyzed (step S2006), the UPnP control point obtains pieces of information of various devices. For example, since the image data of the icon is acquired from an URL described in an icon tag (<icon> and </icon> in FIG. 4), the icon can be displayed on the display area.

In this embodiment, a printing scheme for printing a digital image by directly communicating with the printer is called "direct print". Also, in this embodiment, a system for implementing the direct print in accordance with a direct print protocol defined by PictBridge (see CIPA DC-001-2003 Digital Photo Solutions for Imaging Devices) is called "DPS", and an operation mode for implementing the DPS is called "DPS mode". Assume that the UPnP control point serves as the DVC 1001 which is set in the DPS mode, and stands by until a DPS-compatible printer is connected to the network in order to implement the DPS mode. For example, assume that when the operation unit 1018 instructs the DVC to shift to the DPS mode, a DPS-compatible printer is not present on the network. In such a case, the DVC 1001 determines whether or not a UPnP device which anew participates in the network is DPS-compatible. If the DPS-compatible UPnP device is present, the DVC 1001 shifts the operation mode to the DPS mode.

In this case, first, on the basis of an analysis result obtained in step S2006, it is determined whether or not the UPnP device is DPS-compatible. In this embodiment, this determination is executed in accordance with the presence/absence of a <DPS> tag. If the device is DPS-compatible, the UPnP device transmits a DPS_configuration message, and stands by until a correct response returns (step S4011). Note that the DVC 1001 always transmits a single message to the printer serving as a destination UPnP device twice or more. This is because the destination device can fail to detect this message when transmitting the message only once, and the destination device must receive the message correctly. When the requested message is correctly understood, the UPnP device immediately returns a response message (DPS_Configuration_Information message) (step S4012). Note that the UPnP device transmits the response message only to the first-received message, and ignores the remaining messages transmitted after the first-received message.

When the UPnP device understands the command, returns the correct message, and has a service for connecting the target UPnP device to its own UPnP control point (i.e., the UPnP control point of the DVC 1001), the UPnP device automatically shifts to the DPS mode (step S4013). Upon receiving the correct message from the UPnP device, the UPnP control point also shifts to the DPS mode (step S4014). Furthermore, by displaying the icon of the connected UPnP device on the display area of the UPnP control point, it is explicitly indicated that the connection is actually established (step S4015).

When the UPnP device leaves the network, the message is transmitted to the multicast address in accordance with SSDP by using ssdp:byebye which has the same format as that of the Advertise message (step S2008). Note that the UPnP device can leave the network independently of the reception of the ssdp:byebye message (step S2009). In UPnP, when the UPnP device has participated in the network, the UPnP device must transmit the Advertise message into the network within a time-out value described in a CACHE-CONTROL header again. Alternatively, the UPnP control point determines that the UPnP device leaves the network, and deletes the device information of the UPnP device from the UPnP control point. That is, when the above-described ssdp:byebye message is received, or the next discovery message is not received within a time-out value described in the CACHE-CONTROL header supplied to the discovery message, the UPnP control point determines that the UPnP device leaves the network, and deletes the corresponding device information (step S2010). At this time, all of the pieces of information of the icon display and the control and event of the various UPnP devices must be canceled to clear the data.

FIG. 4 shows an example of the description file acquired by an URL transmitted by ssdp:alive. According to this description file, the electronic device serves as a Printer device, has one PrintBasic service, and has the friendlyName of "UPnP BJ Printer". The icon is printer.png, and its URL is http://192.168.0.3/images/printer.png. As described above, the description file in which the detailed information of the devices is described in XML is included in a Description XML message returned by transmitting the HTTP GET request to the URL described in the Advertise message. Since such the description file is acquired, SCPDURL including a service description file which describes the frientlyName of the device, model name, serial number, and detailed information of the service of the electronic device, controlURL for controlling the service when the service is actually present, and eventSubURL for acquiring the state variable can be obtained. Note that UPnP defines a Basic device as the UPnP device which has no service, and a device which has no detailed information of the services such as Control and Eventing.

Operation in the case wherein the DVC 1001 instructed to shift to the DPS mode participates in the network including the plurality of UPnP devices will be described below. In this case, the DVC 1001 extracts the UPnP device (e.g., the printer) which provides the DPS mode, from the plurality of UPnP devices on the network.

Figure 5:
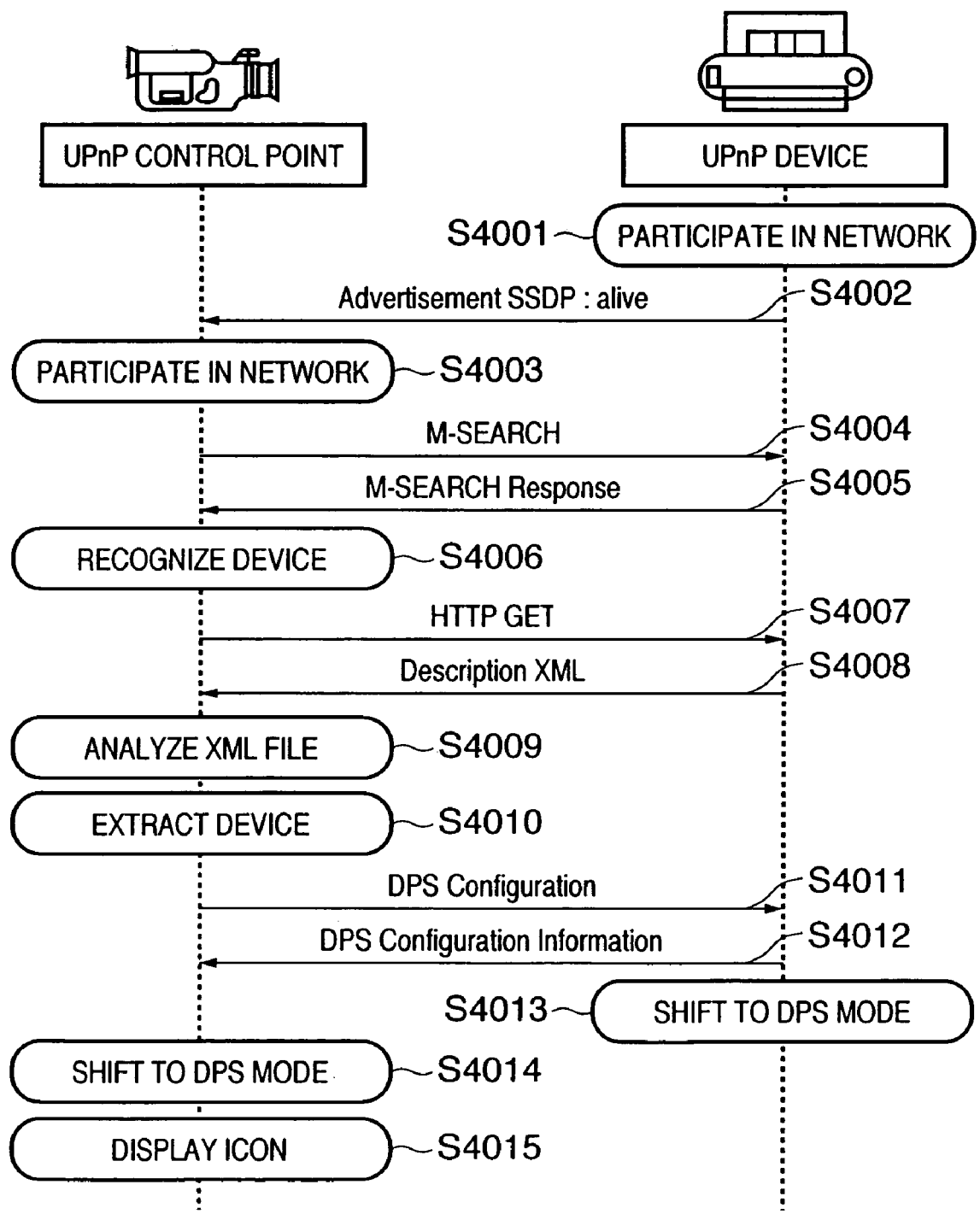
FIG. 5 is a flowchart for explaining exchange of the messages when the digital video camera serving as an UPnP control point participates in the network.

In FIG. 5, at the instant when the UPnP device participates in the network (step S4001) to transmit the ssdp:alive message (step S4002), the UPnP control point does not participate in the network.

When the UPnP control point acquires the IP address to participate in the network (step S4003), the Advertise message has already been transmitted from the UPnP device. Hence, the UPnP control device must stand by for a time described in the CACHE-CONTROL header until the next message is received. Therefore, upon acquiring the IP address and participating in the network (step S4003), the DVC 1001 in this embodiment immediately issues an M-SEARCH message for searching for an arbitrary UPnP device of the discovery messages (step S4004). The M-SEARCH message is transmitted, in the format of an ssdp:discover message, to the multicast address by SSDP. At this time, in an ST header which designates the UPnP device to be searched for, upnp:rootdevice having all of the UPnP devices as targets is designated. Note that since the object of searching for the predetermined UPnP device can be achieved even when ssdp:all having all of the UPnP devices and services as targets is designated in the ST header, this operation can also be available in this embodiment.

All of the UPnP devices receiving the M-SEARCH message describe upnp:rootdevice designated as a target in the ST header, and return a response (M-SEARCH Response) with an URL of the description file (step S4005). The UPnP control point recognizes all of the UPnP devices which return the responses (step S4006). In order to acquire the description file from each of the UPnP devices, the HTTP GET command is transmitted to the URL described in the M-SEARCH Response received from each of the UPnP devices (step S4007). The UPnP device which receives the request of the description file by the HTTP GET command transmits the description file (Description XML) as the HTTP response (step S4008).

The digital video camera 1001 analyzes the XML description of the device description transmitted from the UPnP device, and acquires and holds the various pieces of information as described with reference to FIG. 4, for each of the UPnP devices. Since the digital video camera 1001 is designated to shift to the DPS mode after step S4010, as shown in FIG. 5, the UPnP device corresponding to the designated mode (a printer corresponding to the direct print mode in this embodiment) is extracted on the basis of the information held in step S4009, and then the DVC 1001 shifts its operation mode to the DPS mode if the corresponding UPnP device is found.

First, on the basis of an analysis result obtained in step S4009, the DPS-compatible UPnP device is extracted (step S4010) to determine a device candidate for implementing the direct print. As described above, the presence/absence of a <DPS> tag is checked. If the device candidate can be determined, the UPnP device transmits a Configuration message to the device candidate, and stands by until a correct response returns (step S4011). Note that, as described above, the DVC 1001 always transmits a single message to the printer serving as a destination UPnP device twice or more. When the UPNP device correctly understand the requested message, the UPnP device immediately returns a response message (DPS_Configuration_Information message) (step S4012). The UPnP device transmits the response message only to the first-received message, and ignores the remaining messages.

When the UPnP device (above device candidate) understands the command, returns the correct message, and has a service for connecting the target UPnP device to the UPnP control point (i.e., the UPnP control point of the DVC 1001), the UPnP device automatically shifts to the DPS mode (step S4013). Upon receiving the correct message from the UPnP device, the UPnP control point also shifts to the DPS mode (step S4014). Furthermore, by displaying the icon of the connected UPnP device on the display area of the UPnP control point, it is represented whether the connection is actually established (step S4015).

As described above, the DVC 1001 can automatically extract the DPS-compatible UPnP device from the plurality of electronic devices 1002 to 1004 connected to the network.

Figure 6:
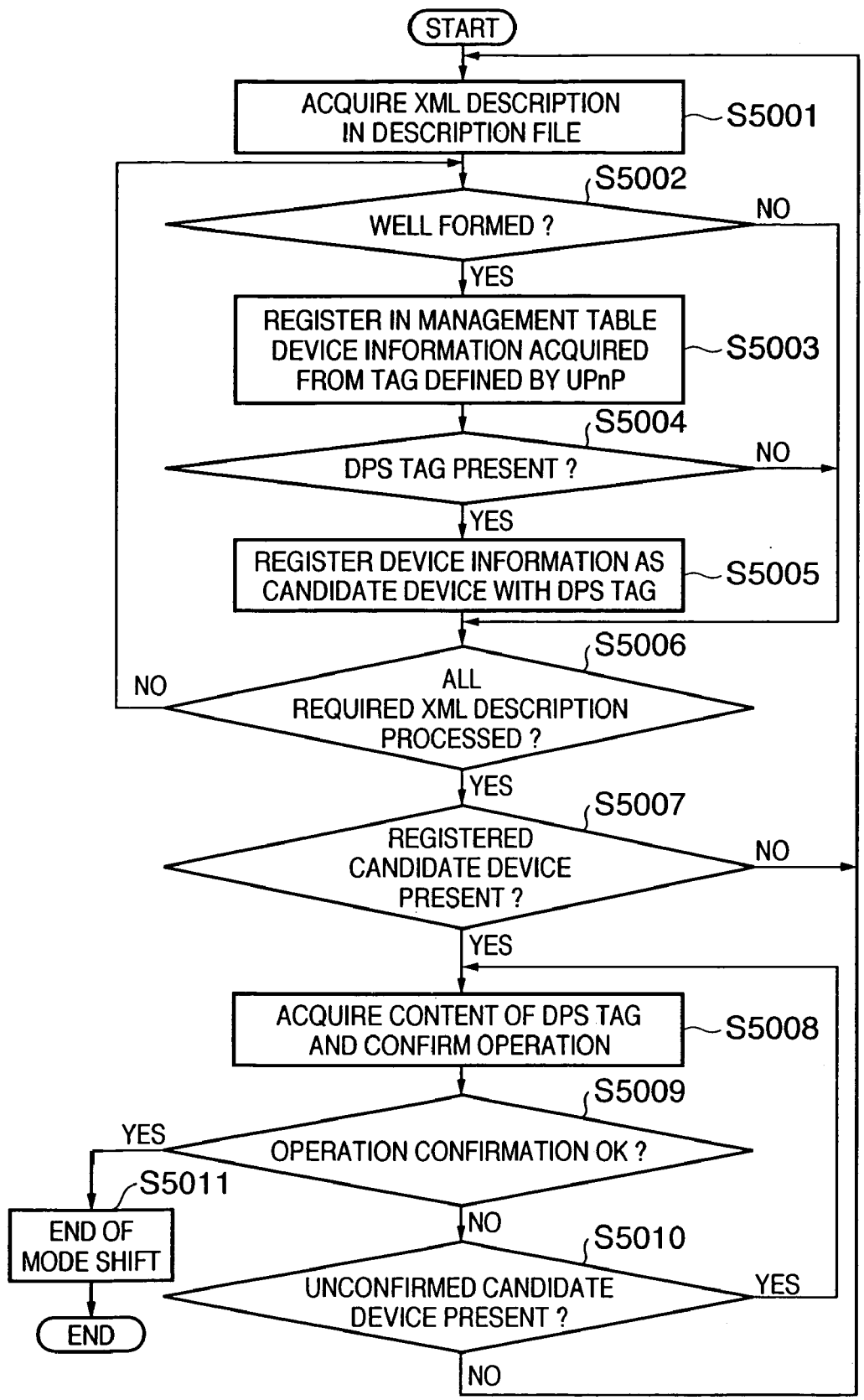
FIG. 6 is a flowchart for explaining the procedure of causing the UPnP control point to extract the UPnP device, and shift its operation mode.

With reference to the flowchart in FIG. 6, the process for analyzing the XML file and extracting the device as shown in steps S2006, S4009, and S4010 will be described in detail below. FIG. 6 is a flowchart for explaining the process for extracting the specific UPnP device by using the description file of the UPnP device. A flowchart for extracting, as the specific DPS-compatible UPnP device, the inkjet printer 1002 having the description file in FIG. 4 will be explained below.

First, in the method described in steps S2002 to S2006 in FIG. 3 or steps S4004 to 4008, the XML description of the description file is acquired (step S5001). In steps S5002 to S5006, the acquired XML description of the device description file will be analyzed.

In step S5002, it is checked whether the entire file described in XML is described as XML syntax in a well-formed format. When the file is not the well-formed XML document, the process is interrupted because this description file is inappropriate, and the flow skips to step S5006 to shift to the next XML description. When the file is the well-formed XML document, the flow advances to step S5003, and the contents of an element enclosed in a tag defined by UPnP, such as friendlyName and deviceType of elements described in each tag are registered in a management table. The contents of the element described in the management table can be used for displaying the icon, categorizing the device, and displaying the data to the user. When presentationURL is described, for example, an HTML page, through which the information of the UPnP device can be obtained and the UPnP device can be operated by accessing to the URL, can be used (see above-described "UPnP Device Architecture Version 1.0, 8 Jun. 2000 10:41 AM" for the detail of the device description).

In step S5004, the presence/absence of the DPS tag is determined. When the DPS tag is present, the device is registered with the content of the DPS tag as the candidate device (step S5005). The described-above processes in step S5002 to S5005 are executed for each XML description acquired in step S5001 (step S5006). Note that since the UPnP control point and UPnP device are designated to shift to the DPS mode, the DPS tag is used in steps S5004 and S5005. When the UPnP control point and UPnP device are designated to shift to another mode, the corresponding tags are checked. Of course, some operation modes can be determined in accordance with the contents of the tag element defined by UPnP.

As described above, when the all of the acquired XML files are completely analyzed, in step S5007, the presence/absence of the candidate device registered in step S5005 is determined. If the candidate device is absent, the flow returns to step S5001. If the candidate device is present, the flow advances to step S5008 to extract a DPS tag element stored in correspondence with the candidate device. The contents of the DPS tag element represent a port number of DPS used when operating the device in the DPS mode. The data is transmitted for the port number to directly communicate with the specific UPnP device. On the basis of the contents of the DPS tag element, the Configuration such as DPS version information and packaged service contents is inquired to the target UPnP device. Hence, the UPnP device which receives the correct response message from the target UPnP device is determined as the DPS device (steps S5009 and S5011). When the correct response message is not returned, it is determined that the validation is no good. The flow advances from step S5009 to step S5010 to determine the presence/absence of an unconfirmed candidate device registered in step S5005. If YES in step S5010, the flow returns to step S5008.

As described above, the UPnP device which adapts a desired operation mode is automatically searched for from the plurality of the UPnP devices on the network. When the adaptive UPnP device is found, the UPnP control point automatically shifts its operation mode to the desired operation mode, and displays the icon of the candidate device (steps S4014 and S4015).

Figure 7:
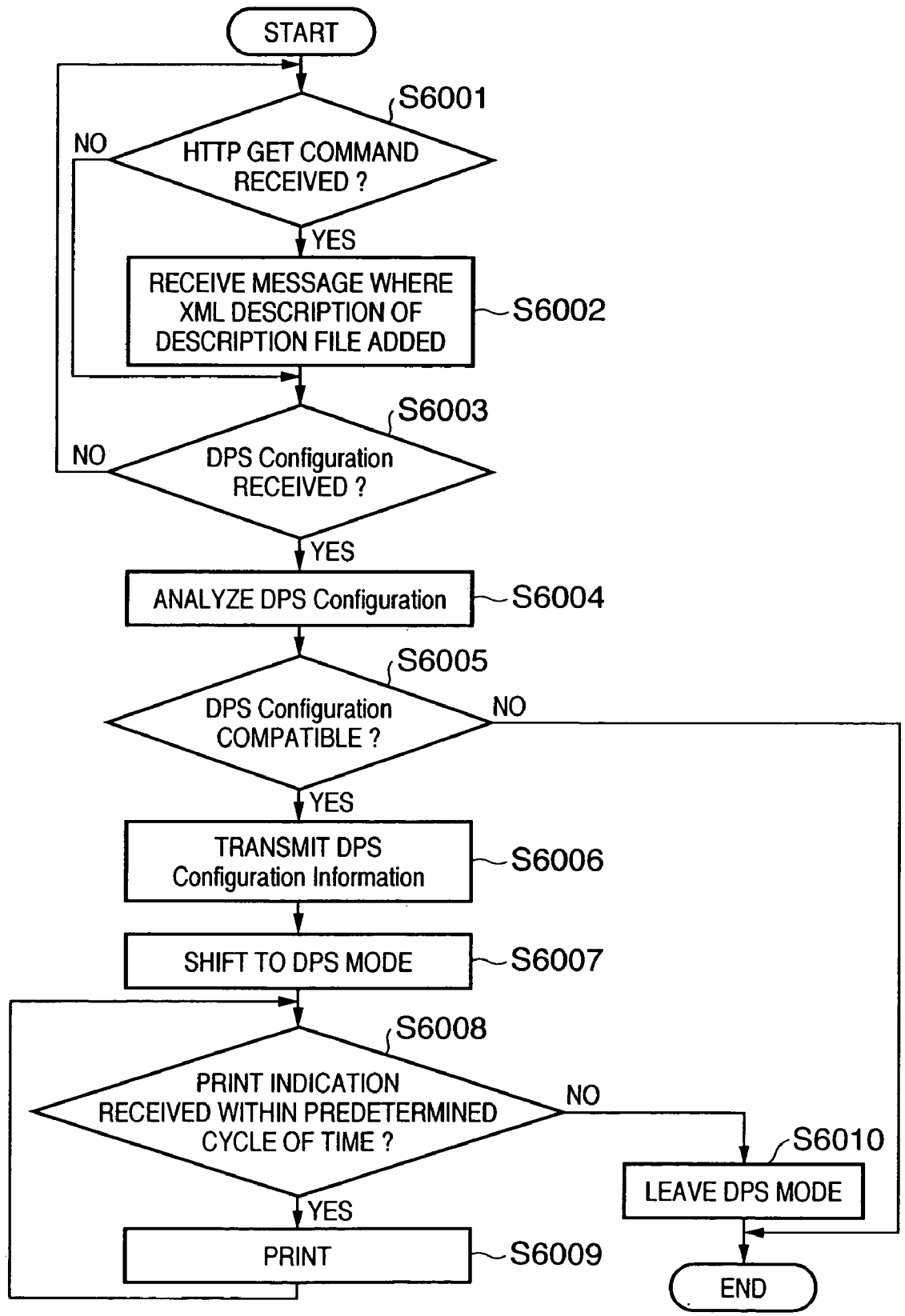
FIG. 7 is a flowchart for explaining the procedure of shifting the mode on the UPnP device side.

The operation on the UPnP device side will be explained below with reference to the flowchart shown in FIG. 7. In step S6001, when the HTTP GET command is received, the flow advances to step S6002. The UPnP device acquires the XML description of its description file, and adds this XML description to the Description XML message to return this message to the source of the HTTP GET command (steps S2004, S2005, S4007, and S4008).

When receiving the DPS Configuration, the flow advances from step S6003 to step S6004 to analyze the received DPS Configuration. As a result of this analysis, when it is determined that the UPnP device is DPS-compatible, the flow advances to step S6006. The DPS Configuration Information message is returned to the source of the DPS Configuration message (steps S4011 and S4012) to shift the operation mode to the DPS mode in step S6007 (step S4013 in FIGS. 3 and 5).

The UPnP device then directly receives print data from the UPnP control point (DVC 1001) which issues the DPS Configuration message to print the image (steps S6008 and S6009).

Note that in this embodiment, after shifting the printer serving as the UPnP device to the DPS mode, when the access from the UPnP control point side is not received after a predetermined cycle of time, e.g., when the process in the DPS mode is interrupted on the UPnP control point (DVC) side, the flow advances from step S6008 to step S6010. In step S6010, the UPnP device terminates the DPS mode to return to a normal mode. The predetermined cycle of time is preferably set as a time adequately shorter (e.g., ¼ of the retransmission time) than the retransmission time of its own Advertise message (retransmission interval of the ssdp:alive message).

Furthermore, in the wireless communication, when the data is not transmitted/received for a predetermined cycle of time since the network is disconnected because of a blind area or radio shielding, the network interface unit 1019 for the wireless communication is reset. When receiving a reset signal from the network interface unit 1019, the CPU 1015 terminates the DPS mode and shifts to the normal mode. The CPU 1015 also deletes the pieces of information of the various devices stored in the RAM 1017, to shift the states of the display unit 1014 and operation unit 1018 to the initial states.

As described above, in this embodiment, the digital video camera 1001 serving as the UPnP control point shifts to the DPS mode, directly extracts the inkjet printer 1002 serving as the specific printer, and then displays the icon on the display unit 1014 on the basis of the device information stored in the internal RAM 1017. By selecting the desired image data to be printed, using the operation unit 1018, from the pieces of image data in a memory card serving as an internal storage area, the selected data is transmitted to the target inkjet printer 1002, and the inkjet printer 1002 starts a printing job.

Note that the contents enclosed in the DPS tag represent the specific port number for printing. Between the UPnP control point and the UPnP device, all printing process data is transmitted/received for the port number. Therefore, when using a constant value, the printer can shift to the DPS mode even when the printer receives the access from the undesired device. Hence, the inkjet printer 1002 may change the port number whenever accessing to the device description. With this operation, a unique transmission path with the specific UPnP control point can be established.

In this embodiment, when extracting the target UPnP device, the DPS tag is used to extract the target UPnP device. However, the tag element name is not limited to DPS. The present invention can incorporate another tag element which can be uniquely specified. Likely, the object of the present invention can be achieved by using the combination of the name and contents of the element which can be uniquely specified.

In the DVC 1001, when a target device is absent in the network (e.g., when the UPnP device fails to be extracted in step S4010, or when the UPnP device cannot be confirmed in step S4011), the operation mode may be immediately switched, or the UPnP device may leave the network. With this operation, power consumption caused by various packets received by the DVC 1001 can be suppressed.

As described above, in this embodiment, in a network including the plurality of digital devices, a command for inquiring a target device can be transmitted to automatically extract an optimal device from the response data. Hence, a highest-quality and most effective device for its image data can be selected. Note that in the present invention, the digital video camera can be replaced with an electronic device such as a digital camera or cellular phone.

Of course, the object of the present invention can be achieved even by supplying a storage medium which stores software program codes for implementing the functions of the above-described embodiment to the system or apparatus and causing the computer (or a CPU or MPU) of the system or apparatus to read out and execute the program codes stored in the storage medium.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-024729 filed Jan. 30, 2004, which is hereby incorporated by reference herein.

What is claimed is:

1. An electronic device comprising:
a network interface unit that connects the electronic device to a network, and receives description information from network devices;
a control processor that analyzes the description information received from the network devices to find a candidate device from the network devices, and transmits a predetermined message to the candidate device to determine whether the candidate device is adapted to a direct print mode; and
a display that displays an icon corresponding to the candidate device, if the control processor determines that the candidate device is adapted to the direct print mode and changes an operation mode of the electronic device to the direct print mode,
wherein the control processor (a) changes the operation mode of the electronic device to the direct print mode so that the electronic device can communicate with the candidate device in accordance with a direct print protocol, if the control processor determines that the candidate device is adapted to the direct print mode, and (b) does not change the operation mode of the electronic device to the direct print mode, if the control processor determines that the candidate device is not adapted to the direct print mode.

2. The electronic device according to claim 1, wherein the network is a UPnP (Universal Plug and Play) network.

3. The electronic device according to claim 1, wherein the electronic device participates in the network as a UPnP (Universal Plug and Play) control point.

4. The electronic device according to claim 1, wherein the electronic device is one of a digital video camera, a digital camera and a cellular phone.

5. The electronic device according to claim 1, wherein the network includes a wireless network.

6. A method of controlling an electronic device, comprising the steps of:
connecting the electronic device to a network through a network interface unit included in the electronic device;
receiving description information from network devices through the network interface unit;

analyzing the description information received from the network devices to find a candidate device from the network devices;

transmitting a predetermined message to the candidate device to determine whether the candidate device is adapted to a direct print mode;

changing an operation mode of the electronic device to the direct print mode so that the electronic device can communicate with the candidate device in accordance with a direct print protocol, if it is determined that the candidate device is adapted to the direct print mode; and displaying an icon corresponding to the candidate device, if it is determined that the candidate device is adapted to the direct print mode and the operation mode of the electronic device is changed to the direct print mode, wherein the operation mode of the electronic device does not change to the direct print mode, if it is determined that the candidate device is not adapted to the direct print mode.

7. The method according to claim 6, wherein the network is a UPnP (Universal Plug and Play) network.

8. The method according to claim 6, wherein the electronic device participates in the network as a UPnP (Universal Plug and Play) control point.

9. The method according to claim 6, wherein the electronic device is one of a digital video camera, a digital camera and a cellular phone.

10. The method according to claim 6, wherein the network the network includes a wireless network.

* * * * *